US012644492B2

(12) United States Patent　　　　(10) Patent No.:　US 12,644,492 B2

Konomoto　　　　　　　　　　　　　　(45) Date of Patent:　Jun. 2, 2026

(54) METHOD FOR FIXING BOOT TO CONSTANT VELOCITY UNIVERSAL JOINT

(71) Applicant: NTN CORPORATION, Osaka (JP)

(72) Inventor: Takeyoshi Konomoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 248 days.

(21) Appl. No.: 18/281,607

(22) PCT Filed: Mar. 9, 2022

(86) PCT No.: PCT/JP2022/010312

§ 371 (c)(1),
(2) Date: Sep. 12, 2023

(87) PCT Pub. No.: WO2022/202327

PCT Pub. Date: Sep. 29, 2022

(65) Prior Publication Data

US 2024/0159279 A1　　May 16, 2024

(30) Foreign Application Priority Data

Mar. 24, 2021　(JP) ................................. 2021-050556

(51) Int. Cl.
F16D 3/84　　　(2006.01)
F16B 2/08　　　(2006.01)
(Continued)

(52) U.S. Cl.
CPC ................ F16D 3/845 (2013.01); F16B 2/08 (2013.01); F16D 3/2055 (2013.01); (Continued)

(58) Field of Classification Search
CPC ................... F16D 3/845; F16D 3/2055; F16D 2003/22316; F16B 2/08; F16J 3/042; Y10S 464/905

(Continued)

(56) References Cited

U.S. PATENT DOCUMENTS 5,911,301 A * 6/1999 Ozawa ................... B23P 19/084
7,326,119 B2 * 2/2008 Toriumi ................... F16J 3/042
464/175

(Continued)

FOREIGN PATENT DOCUMENTS

EP　　　3 358 203　　　8/2018
JP　　　1-118227　　　8/1989
(Continued)

OTHER PUBLICATIONS

International Search Report (ISR) issued May 17, 2022 in International (PCT) Application No. PCT/JP2022/010312.

*Primary Examiner* — Greg Binda

(74) *Attorney, Agent, or Firm* — Wenderoth, Lind & Ponack, L.L.P.

(57) ABSTRACT

A method for fixing a boot of a constant velocity universal joint includes fitting the boot to an outer periphery of an outer joint member, causing a boot band to circle around an outer periphery of the boot, and fastening the boot by reducing a diameter of the boot band. A portion of the boot band to which a pressing force in an inner diameter direction is applied when the diameter of the boot band is reduced is arranged in a circumferential region of a thin portion of the boot.

12 Claims, 15 Drawing Sheets

(51) Int. Cl.

| | |
|---|---|
| *F16D 3/205* | (2006.01) |
| *F16D 3/223* | (2011.01) |
| *F16J 3/04* | (2006.01) |

(52) U.S. Cl.
CPC ..... *F16D 2003/22316* (2013.01); *F16J 3/042* (2013.01); *Y10S 464/905* (2013.01)

(58) Field of Classification Search
USPC ........................................................ 464/111
See application file for complete search history.

(56) References Cited

U.S. PATENT DOCUMENTS

| | | | |
|---|---|---|---|
| 8,187,110 B2 * | 5/2012 | Watanabe | F16J 3/042 464/175 |
| 10,364,833 B2 * | 7/2019 | Tomogami | C23C 22/82 |
| 10,550,894 B2 * | 2/2020 | Takabe | F16J 3/04 |

| | | | |
|---|---|---|---|
| 2006/0123604 A1 | 6/2006 | Ogino | |
| 2008/0125232 A1 | 5/2008 | Yamamoto et al. | |
| 2014/0115857 A1 | 5/2014 | Hatano et al. | |
| 2018/0200849 A1 | 7/2018 | Ogata et al. | |

FOREIGN PATENT DOCUMENTS

| | | |
|---|---|---|
| JP | 7-010562 | 2/1995 |
| JP | 2006-144922 | 6/2006 |
| JP | 4403728 | 1/2010 |
| JP | 2010-084900 | 4/2010 |
| JP | 2010-121704 | 6/2010 |
| JP | 2013-19488 | 1/2013 |
| JP | 2013-204618 | 10/2013 |
| JP | 2017-082911 | 5/2017 |
| JP | 2018-84306 | 5/2018 |
| JP | 2019-002550 | 1/2019 |
| JP | 2019-35487 | 3/2019 |
| JP | 2020-029915 | 2/2020 |
| JP | 2020-41661 | 3/2020 |

* cited by examiner

METHOD FOR FIXING BOOT TO CONSTANT VELOCITY UNIVERSAL JOINT

TECHNICAL FIELD

The present invention relates to a method for fixing a boot to a constant velocity universal joint.

BACKGROUND ART

The constant velocity universal joint transmits rotational power between two shafts on a drive side and a driven side at a constant velocity, and is incorporated in a power transmission system of an automobile, various industrial machines, or the like, for example. The constant velocity universal joint includes a cup-shaped outer joint member and an inner joint member arranged in an internal space of the outer joint member, and is usually used in a state where the internal space of the outer joint member is filled with a lubricant such as grease. In order to prevent external leakage of the lubricant and intrusion of foreign matter into the joint, a cylindrical boot formed of an elastic material such as rubber or resin is provided in the opening of the outer joint member. One end of the boot is fixed to the outer joint member, and the other end of the boot is fixed to a shaft coupled to the inner joint member.

A cylindrical portion provided at one end and the other end of the boot is generally fixed to an attachment object by fastening an outer peripheral surface thereof with a fastening member called a boot band. As the boot band, (1) omega type (see Patent Literature 1), (2) low profile type (see Patent Literature 2), (3) one-touch type (see Patent Literature 3), and the like are known. Hereinafter, each boot band will be described in detail with reference to the drawings.

(1) Omega Type Boot Band (See FIGS. 10 to 13)

An omega type boot band 100 is formed by a metal band plate member 101. In one end region 110 in a longitudinal direction (right side of FIGS. 10 and 11) of the band plate member 101, a lug portion 111, engagement holes 112, 113, and 114, and a recess 115 are formed. The lug portion 111 is formed by bending apart of the band plate member 101, and has an Ω shape in a side view including a pair of leg portions 111a separated in a circumferential direction and a top portion 111b connecting ends of the pair of leg portions 111a. The recess 115 is formed, for example, by forming a pair of slits extending in the longitudinal direction in the band plate member 101 and raising a portion (remaining portion) between the slits in a protruding shape. In the other end region 120 in the longitudinal direction (left side of FIGS. 10 and 11) of the band plate member 101, projections 121, 122, and 123 and an extending portion 124 having a constant width extending in the longitudinal direction are provided.

When fastening the boot band 100, as illustrated in FIG. 12, the boot band 100 is made into a ring shape, both end regions 110 and 120 are overlapped, and the projections 121, 122, and 123 of the other end region 120 are respectively fitted into the engagement holes 112, 113, and 114 of one end region 110 (both are engaged in the longitudinal direction of the boot band 100). Further, the extending portion 124 provided in the other end region 120 enters the recess 115 provided in the one end region 110 and is engaged in a width direction (axial direction of the outer joint member 2). In this state, as illustrated in FIG. 13, the lug portion 111 is crimped and plastically deformed by a tool T1 from both sides in the circumferential direction. Thus, the ring-shaped band plate member 101 (boot band 100) is reduced in diameter, and a fastening force in a diameter reduction direction is applied to the boot arranged on the radially inner side, and as a result, the boot 20 is fixed to the outer joint member.

(2) Low Profile Type Boot Band (See FIGS. 14 to 17)

A low profile type boot band 200 is formed by a metal band plate member 201. In one end region 210 in the longitudinal direction (right side of FIGS. 14 and 15) of the band plate member 201, a first tool claw 211, engagement holes 212 and 213, and a recess 214 are formed. The recess 214 is formed, for example, by forming a pair of slits extending in the longitudinal direction in the band plate member 201 and raising a portion (remaining portion) between the slits in a protruding shape. In the other end region 220 in the longitudinal direction (left side of FIGS. 14 and 15) of the band plate member 201, a second tool claw 221, a temporary fixing hook 222, engagement claws 223 and 224, and an extending portion 225 extending in the longitudinal direction and having a constant width dimension are formed.

When fastening the boot band 200, as illustrated in FIG. 16, the boot band 200 is made into a ring shape, both end regions 210 and 220 are overlapped, and the second tool claw 221 and the temporary fixing hook 222 of the other end region 220 are inserted into the engagement hole 212 of the one end region 210. In this state, as illustrated in FIG. 17, a tool T2 is hooked on the first tool claw 211 and the second tool claw 221 and is pulled so that the distance between the tool claws 211 and 221 becomes short, thereby reducing the diameter of the ring-shaped boot band 200. Thus, the engagement claws 223 and 224 enter and engage with the engagement holes 212 and 213, respectively, to be in a fastened state in which the diameter reduced state is maintained.

(3) One-Touch Type Boot Band (See FIGS. 18 and 19)

As illustrated in FIG. 18, a one-touch type boot band 300 includes a ring-shaped band main body 301 in which inner side surfaces of both ends of a metal band plate are joined to each other, and an arc-shaped plate-shaped lever 302 joined to an outer side surface of one end of the band main body 301. The band main body 301 is provided with a stopper 303 that holds the folded lever 302. The stopper 303 is formed integrally with or separately from the band main body 301, and has a pair of side portions rising radially outward from both ends in a width direction of the band main body 301.

When fastening the boot band 300, the band main body 301 is reduced in diameter by being folded back with the end of the lever 302 as a fulcrum in a state where the fastening target member is arranged on the inner periphery of the ring-shaped band main body 301, and the fastening target member is fastened and fixed (see FIG. 19). The folded lever 302 is overlapped with the band main body 301 and fitted and held between the pair of side portions of the stopper 303.

CITATIONS LIST

Patent Literature

Patent Literature 1: JP 2018-84306A
Patent Literature 2: Japanese Patent No. 4403728
Patent Literature 3: JP 2020-41661 A

SUMMARY OF INVENTION

Technical Problems

Meanwhile, in a tripod type constant velocity universal joint which is a kind of plunging type constant velocity universal joint, as illustrated in FIG. 20, three track grooves 5 extending in the axial direction are formed at a plurality of locations in the circumferential direction of an inner peripheral surface of the outer joint member 2, and an outer peripheral surface of the outer joint member 2 has a non-perfect circular shape having recesses 2a between the adjacent track grooves 5. An inner peripheral surface of a large-diameter end 21 of the boot 20 fitted to the outer joint member 2 has a non-perfect circular shape following the outer peripheral surface of the outer joint member 2. Consequently, a thick portion 21L and a thin portion 21S are alternately formed in the large-diameter end 21 of the boot 20 in the circumferential direction.

For example, when the outer joint member 2 of the tripod type constant velocity universal joint and the boot 20 are fixed using the boot band 100 of the above (1) omega type, the lug portion 111 is crimped from both sides in the circumferential direction by the tool T1 as illustrated in FIG. 21. At this time, the crimping operation of the lug portion 111 is performed while pressing the tool T1 in an inner diameter direction so that the tool T1 does not come off from the lug portion 111. Specifically, the tool T1 is brought into contact with an inner diameter end of each leg portion 111a of the lug portion 111 (the boundary between the lug portion 111 and regions adjacent to both sides in the circumferential direction of the lug portion 111), and the pair of leg portions 111a is pushed by a force F in a direction inclined to an inner diameter side toward the side approaching each other (see arrows in the drawing). The boot 20 is compressed in a radial direction by a component force in the radial direction (pressing force in the inner diameter direction) of a pressing force F by the tool T1 (in FIG. 21, a region deformed by the pressing force of the tool T1 in the outer peripheral surface of the boot 20 is represented by a flat surface). As described above, when the boot and the outer joint member are fixed in a state where a part of the boot in the circumferential direction is compressed and deformed, there is a possibility that sealing performance is deteriorated in the deformed portion of the boot.

When the outer joint member of the tripod type constant velocity universal joint and the boot are fixed using the boot band 200 of the above (2) low profile type, the tool claws 211 and 221 are fastened while pressing the tool against the boot band 200 in the inner diameter direction. Therefore, a problem similar to the above described one may occur.

When the outer joint member of the tripod type constant velocity universal joint and the boot are fixed using the boot band 300 of the above (3) one-touch type, a pressing force in the inner diameter direction is generated at the end of the lever 302 serving as a fulcrum when the lever 302 is folded back. Therefore, a problem similar to the above described one may occur.

Therefore, an object of the present invention is to secure sealability at a fixing portion when a cylindrical boot having a thin portion and a thick portion alternately in a circumferential direction is fixed to an outer periphery of an outer joint member using a boot band.

Solutions to Problems

The present invention made to solve the above problems is a method for fixing a large-diameter end provided in a cylindrical boot and having a thin portion and a thick portion alternately in a circumferential direction to an outer periphery of an outer joint member using a boot band, the method including: fitting the large-diameter end of the boot to the outer periphery of the outer joint member, causing the boot band to circle around an outer periphery of the large-diameter end of the boot, and fastening the large-diameter end of the boot by reducing a diameter of the boot band, in which a portion of the boot band to which a pressing force in an inner diameter direction is applied when the boot band is reduced in diameter is arranged in a circumferential region of a thin portion of the large-diameter end of the boot.

As described above, the present invention is characterized in that the boot band and the outer joint member are aligned in the circumferential direction before fastening the boot band. That is, when the boot band is fastened by reducing the diameter of the boot band with a tool or a lever, a portion (tool abutting portion or lever fulcrum) of the boot band to which a pressing force in the inner diameter direction is applied is arranged in the circumferential region of the thin portion of the large-diameter end of the boot. Thus, since the pressing force in the inner diameter direction is applied to the thin portion of the boot, the amount of deformation in a radial direction of the boot can be suppressed, and deterioration in sealing performance due to deformation of the boot can be prevented.

As the boot band, for example, what is called an omega type boot band can be used in which a lug portion having an Ω shape is provided at a part in the longitudinal direction, and the boot is fastened by reducing the diameter of the boot band by crimping the lug portion from both sides in the circumferential direction with a tool. In this case, when the boot band is fastened, the lug portion of the boot band is arranged in the circumferential region of the thin portion of the large-diameter end of the boot, so that deformation of the boot due to the pressing force in the inner diameter direction can be suppressed.

As the boot band, for example, what is called a low profile type boot band that has a pair of tool claws separated in the longitudinal direction and fastens the boot by reducing the diameter of the boot band by bringing the pair of tool claws close to each other with a tool can be used. In this case, when the boot band is fastened, the pair of tool claws of the boot band is arranged in the circumferential region of the thin portion of the large-diameter end of the boot, so that the deformation of the boot due to the pressing force in the inner diameter direction can be suppressed.

As the boot band, what is called a one-touch type boot band can be used that includes a band main body formed in a ring shape by joining both ends of a band plate member and an arc-shaped lever fixed to the band main body in a state where one end is in contact with the band main body and the other end is separated from the band main body, and in which the boot is fastened by reducing the diameter of the boot band by folding back the lever with one end of the lever as a fulcrum. In this case, one end of the lever serving as a fulcrum when the lever is folded back to fasten the boot band is arranged in the circumferential region of the thin portion of the large-diameter end of the boot, so that the deformation of the boot due to the pressing force in the inner diameter direction applied to the fulcrum can be suppressed.

In the boot fixing method described above, it is preferable that the outer joint member is supported by a support member from below, and the large-diameter end of the boot is fastened with the boot band in a state where a protrusion surface provided at an upper end of the support member is fitted in a recess provided on an outer peripheral surface of the outer joint member. Thus, the outer joint member can be stably supported, and work of setting the outer joint member on the support member is facilitated.

Advantageous Effects of Invention

As described above, according to the present invention, deformation of a boot due to a pressing force in an inner diameter direction when fastening a boot band is suppressed, and thus deterioration in sealing performance due to deformation of the boot can be prevented.

DESCRIPTION OF EMBODIMENT

Hereinafter, an embodiment of the present invention will be described with reference to the drawings.

Figure 1:
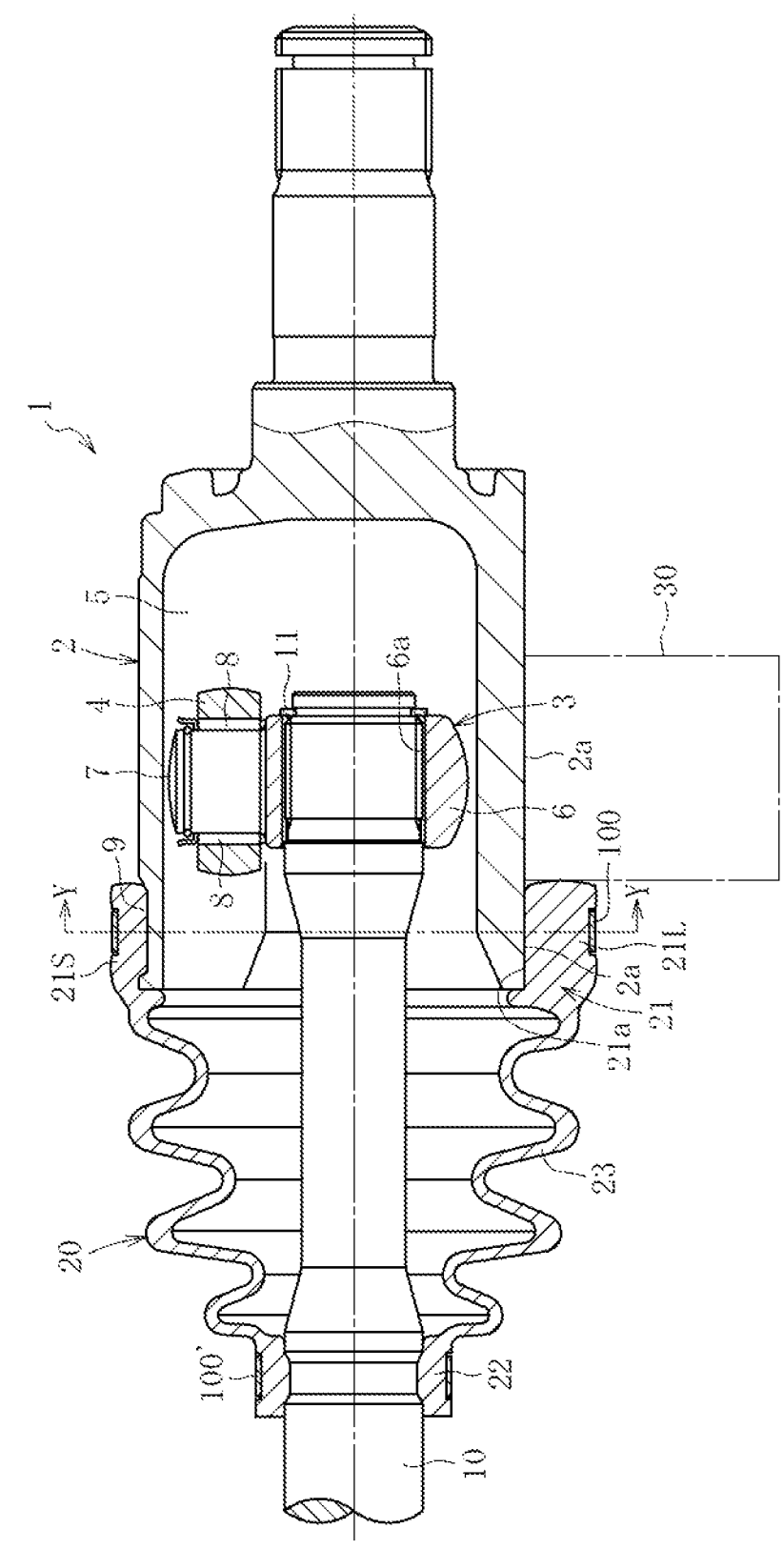
FIG. 1 is an axial cross-sectional view of a tripod type constant velocity universal joint.
Figure 2:
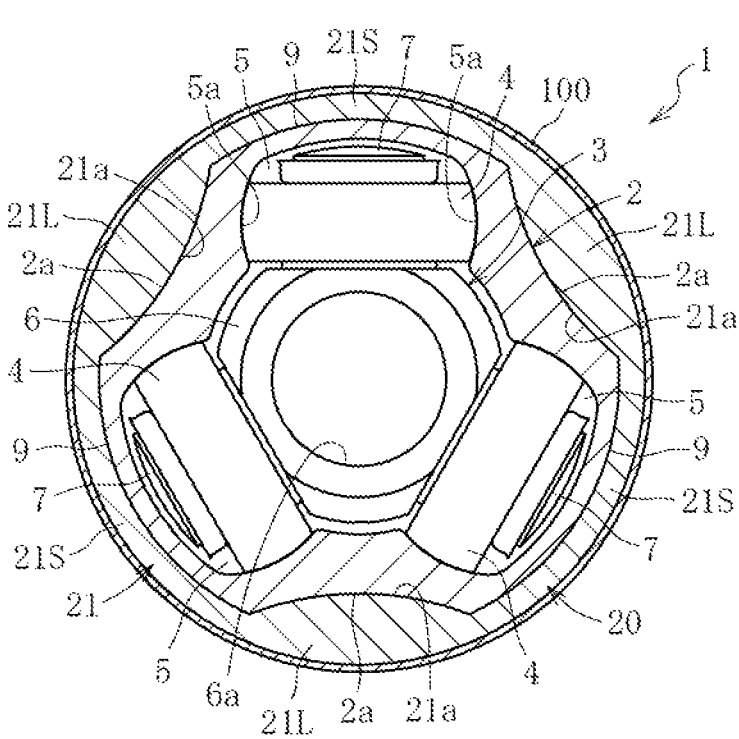
FIG. 2 is an axial orthogonal cross-sectional view of the tripod type constant velocity universal joint (cross-sectional view taken along line Y-Y in FIG. 1).

As illustrated in FIGS. 1 and 2, a tripod type constant velocity universal joint 1 according to the present embodiment includes a cup-shaped outer joint member 2, a tripod member 3 as an inner joint member, and three rollers 4 as rolling elements.

On the inner peripheral surface of the outer joint member 2, three track grooves 5 are formed at equal intervals in the circumferential direction. Each of the track grooves 5 has a pair of roller guide surfaces 5a facing each other in the circumferential direction. Each roller guide surface 5a extends linearly along the axial direction of the outer joint member 2, and is formed in an arc shape in a cross section orthogonal to the axial direction.

The tripod member 3 has a cylindrical boss portion 6 and three leg shafts 7 protruding in the radial direction from the boss portion 6. An end of the shaft 10 is coupled to a center hole 6a of the boss portion 6 by spline fitting. Further, the shaft 10 is prevented from coming off from the boss portion 6 by a snap ring 11. The rollers 4 are rotatably attached to the respective leg shafts 7 via a plurality of needle-shaped rollers 8. The rollers 4 are arranged one by one in each track groove 5 of the outer joint member 2, and by the rollers 4 moving along the roller guide surfaces 5a of the track grooves 5, the tripod member 3 can transmit rotational torque to the outer joint member 2 while permitting angular displacement and axial displacement.

A cylindrical boot 20 is attached between the outer joint member 2 and the shaft 10 for the purpose of preventing foreign matter from entering the joint and preventing leakage of grease sealed in the joint. The boot 20 includes a large-diameter end 21 attached to the outer peripheral surface of the outer joint member 2, a small-diameter end 22 attached to an outer peripheral surface of the shaft 10, and a bellows portion 23 connecting the large-diameter end 21 and the small-diameter end 22. The large-diameter end 21 and the small-diameter end 22 of the boot 20 are fastened and fixed to the outer peripheral surface of the outer joint member 2 and the outer peripheral surface of the shaft 10 by boot bands, respectively. As the boot band attached to the large-diameter end 21 of the boot 20, for example, an omega type boot band 100 illustrated in FIGS. 10 to 13 can be used. Note that details of the boot band 100 are as described above. In addition, a boot band 100' attached to the small-diameter end 22 of the boot 20 is different from the above-described boot band 100 only in the longitudinal direction dimension (circumferential length), and basically has a similar configuration.

As illustrated in FIG. 2, the outer peripheral surface of the outer joint member 2 is thinned by forming a recess 2a between adjacent track grooves 5 in the circumferential direction. On the inner peripheral surface of the large-diameter end 21 of the boot 20, a protrusion 21a is formed at a position corresponding to the recess 2a on the outer peripheral surface of the outer joint member 2. Consequently, in the large-diameter end 21 of the boot 20, the thick portion 21L having a relatively large thickness in the radial direction is formed in a circumferential region of the protrusion 21a, and the thin portion 21S having a relatively small thickness in the radial direction is formed in a circumferential region between protrusions 21a. In order to improve the sealability between the boot 20 and the outer joint member 2, a groove portion 9 in the circumferential direction engaged by the boot 20 biting is formed in a region (large diameter portion) excluding the recess 2a in the outer peripheral surface of the outer joint member 2. In a state where the boot 20 is fastened by the boot band 100, the entire circumferential direction of the inner peripheral surface of the large-diameter end 21 of the boot 20 comes into contact with the outer peripheral surface of the outer joint member 2.

The fixing method of the present invention is applied to fixing the boot 20 and the outer joint member 2 by the boot band 100. Hereinafter, a procedure of a fixing method of the boot 20 will be described.

First, in a state where the shaft 10 is inserted into the inner periphery of the boot 20, an assembly in which the tripod member 3 and the rollers 4 are integrated is fixed to the end of the shaft 10. Thereafter, while the rollers 4 is fitted into the track grooves 5 of the outer joint member 2, the tripod member 3 and the rollers 4 are arranged on the inner periphery of the outer joint member 2. Then, the large-diameter end 21 of the boot 20 is fitted to the outer peripheral surface of the outer joint member 2. At this time, as illustrated in FIG. 2, the protrusion 21a of the inner peripheral surface of the large-diameter end 21 of the boot 20 is aligned with the recess 2a of the outer peripheral surface of the outer joint member 2, and the large-diameter end 21 of the boot 20 is fitted to the outer peripheral surface of an open end of the outer joint member 2.

Figure 3:
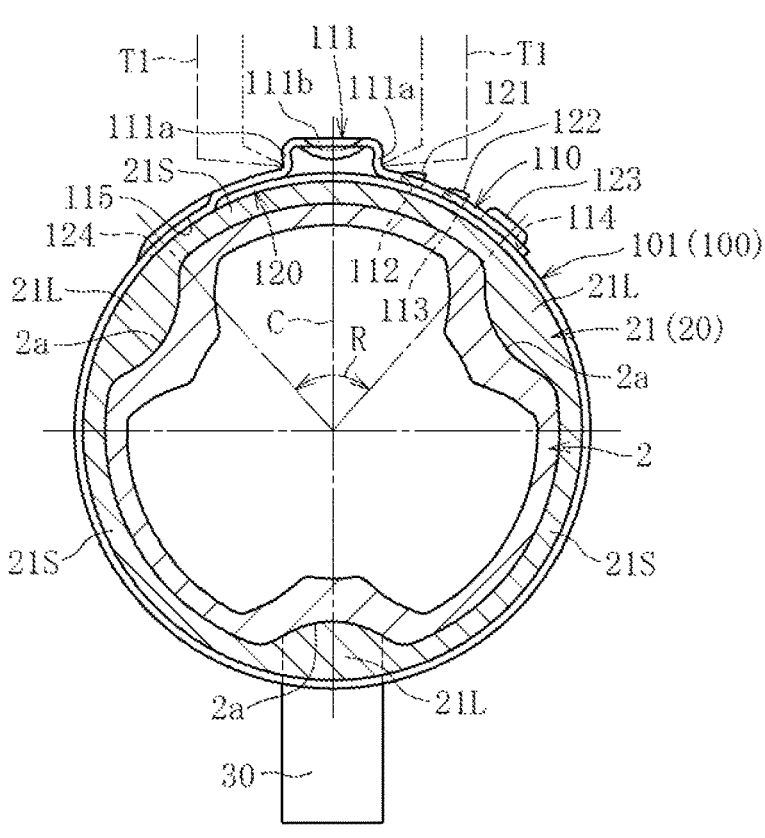
FIG. 3 is an axial orthogonal cross-sectional view of the tripod type constant velocity universal joint having an omega type boot band, illustrating a state before fastening the boot band.
Figure 4:
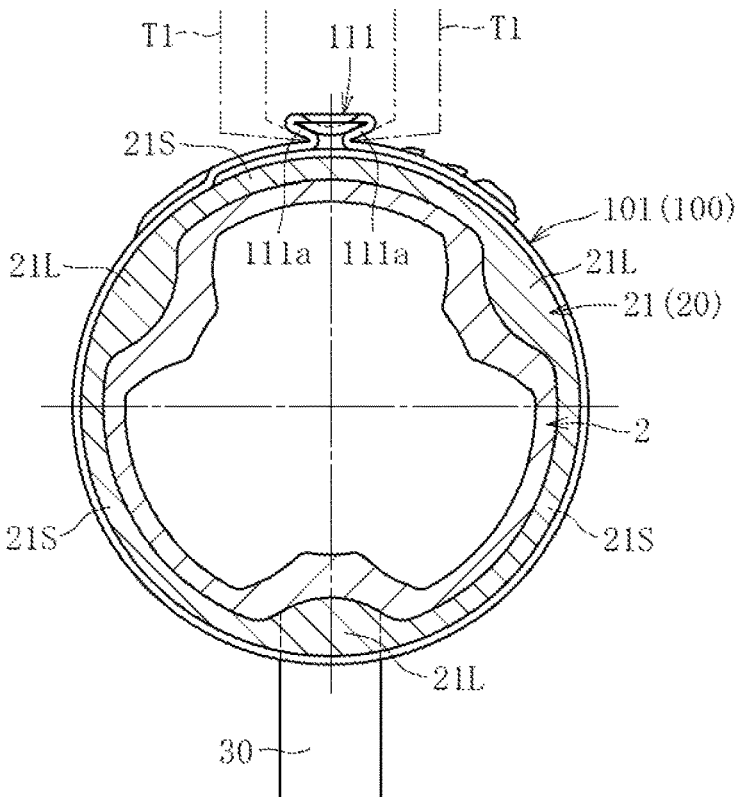
FIG. 4 is a cross-sectional view illustrating a state after the boot band of FIG. 3 is fastened.

Next, as illustrated in FIG. 3, the boot band 100 is caused to circle around the outer periphery of the large-diameter end 21 of the boot 20 in a state where the outer joint member 2 is supported by the support member 30 from below (see FIG. 1). Specifically, the band plate member 101 of the boot band 100 is rounded in a ring shape, and one end region 110 in the longitudinal direction of the band plate member 101 is overlapped on the outer diameter side of the other end region 120 in the longitudinal direction of the band plate member 101. At this time, the projections 121, 122, and 123 provided in the end region 110 on the inner diameter side enter the engagement holes 112, 113, and 114 provided in the end region 120 on the outer diameter side, and these are engaged in the longitudinal direction. Further, the extending portion 124 provided in the end region 120 on the inner diameter side enters the recess 115 provided in the end region 110 on the outer diameter side, and these are engaged in the width direction (axial direction of the outer joint member 2). In FIGS. 3 and 4, illustration of the internal components (tripod member 3, rollers 4, and the like) of the constant velocity universal joint 1 and the shaft 10 is omitted (the same applies to FIGS. 5 to 9 described later).

At this time, the boot band 100 and the boot 20 are aligned in the circumferential direction so that the entire lug portion 111 of the boot band 100 is arranged in a circumferential region R of the thin portion 21S of the boot 20. In the illustrated example, the lug portion 111 is arranged at substantially the center of the circumferential region R of the thin portion 21S of the boot 20 (position overlapping a circumferential center line C of the thin portion 21S). At this time, the thick portion 21L of the boot 20 is arranged at a lower end, and thus the recess 2a of the outer peripheral surface of the outer joint member 2 fitted with the thick portion 21L is arranged at the lower end. The outer joint member 2 can be stably supported by fitting a protrusion surface provided at an upper end of the support member 30 to the recess 2a. Further, when the outer joint member 2 is placed on the support member 30, the recess of the outer joint member 2 is fitted while being guided by the protrusion surface of the support member 30, and the outer joint member 2 is positioned in a predetermined phase (a state where the circumferential center of any one of the track grooves 5 is arranged directly above the support member 30). In this case, the outer joint member 2 is naturally positioned only by placing the outer joint member 2 on the support member 30 by the worker without paying much attention to the positional accuracy of the outer joint member 2 with respect to the support member 20, so that the work is facilitated. In addition, the positional accuracy when setting the outer joint member 2 to the support member 30 is relaxed, and thus this work can be performed by an automatic machine.

In this state, the lug portion 111 is crimped from both sides in the circumferential direction by the tool T1, and the diameter of the band plate member 101 of the boot band 100 rolled into a ring shape is reduced (see FIG. 4). Specifically, the pair of leg portions 111a is deformed by pushing the pair of leg portions 111a of the lug portion 111 toward the side approaching each other with the tool T1. Thus, the large-diameter end 21 of the boot 20 is fastened from the outer diameter by the boot band 100, and the boot 20 is fixed to the outer joint member 2 by this fastening force.

Figure 21:
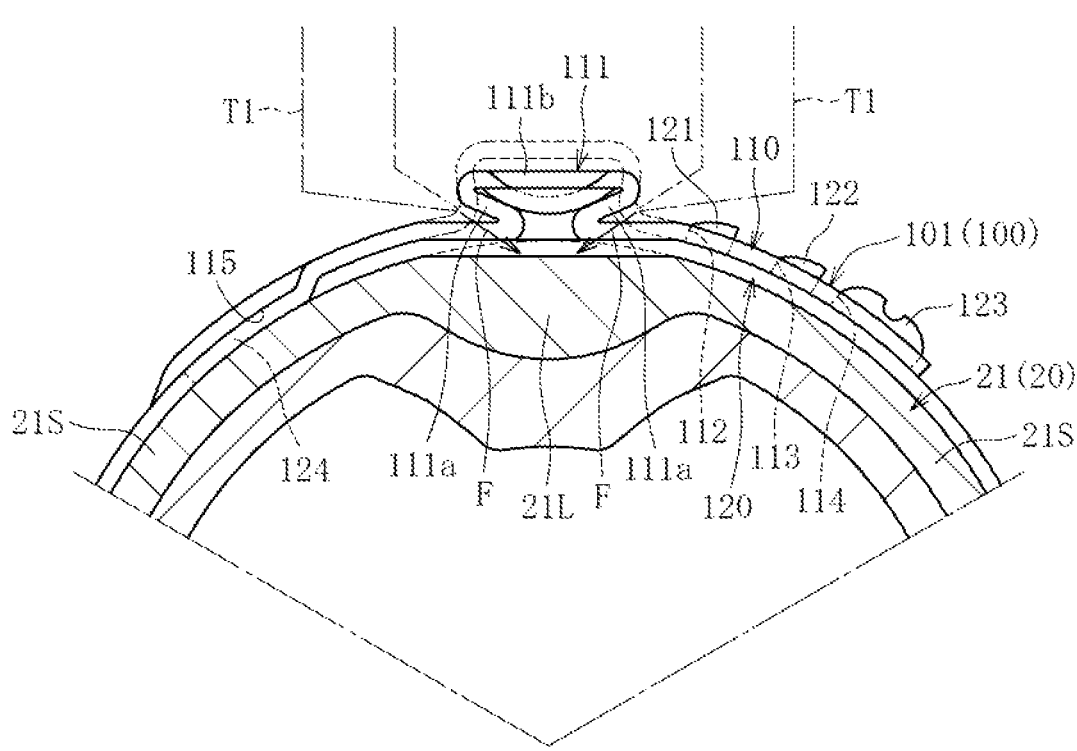
FIG. 21 is an enlarged view of the vicinity of a lug portion in FIG. 20.

When the lug portion 111 is crimped by the tool T1 in this manner, the pressing force in the inner diameter direction by the tool T1 is applied to the boot 20. At this time, since the lug portion 111 is arranged in the circumferential region R of the thin portion 21S of the boot 20 as described above, the pressing force in the inner diameter direction by the tool T1 is applied to the thin portion 21S of the boot 20. Therefore, as compared with a case where the thick portion 21L of the boot 20 is pressed in the inner diameter direction as illustrated in FIG. 21, the deformation amount (compression amount) of the boot 20 can be suppressed. Thus, it is possible to prevent deterioration in sealing performance between the boot 20 and the outer joint member 2 due to deformation of the boot 20.

The present invention is not limited to the above embodiments. Hereinafter, another embodiment of the present invention will be described, but redundant description of points similar to those of the above embodiment will be omitted.

Figure 5:
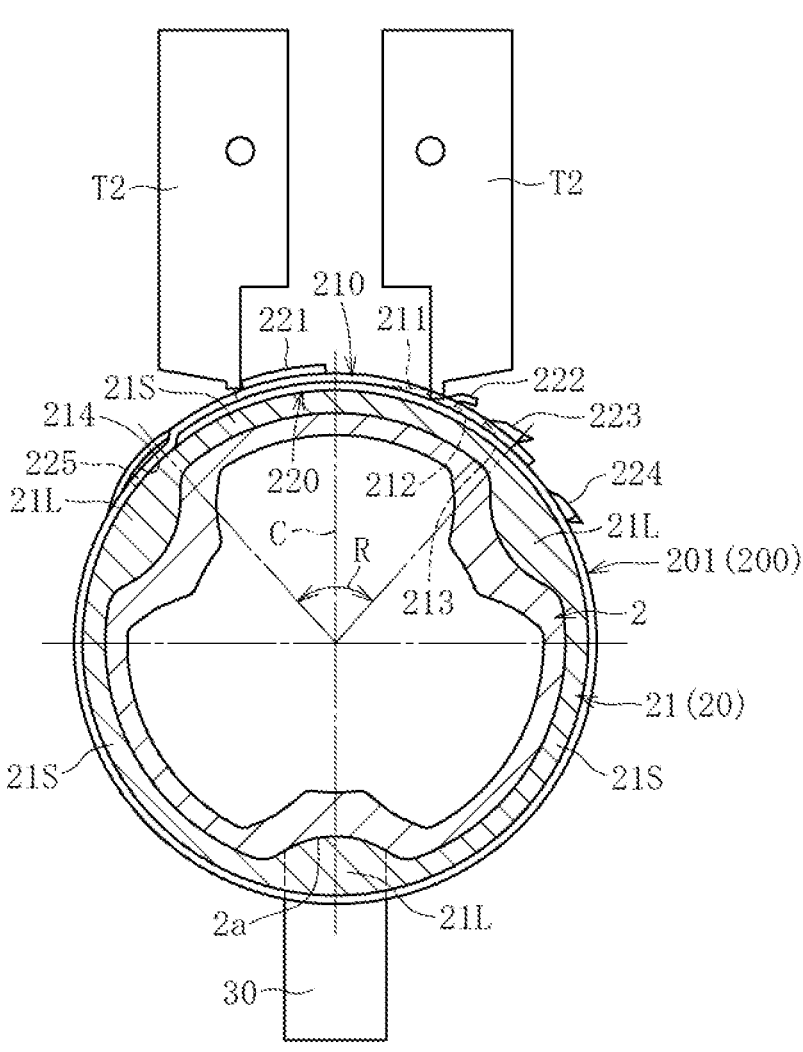
FIG. 5 is an axial orthogonal cross-sectional view of the tripod type constant velocity universal joint having a low profile type boot band, illustrating a state before fastening the boot band.

The boot band for fixing the boot 20 and the outer joint member 2 is not limited to the above, and for example, the boot band 200 of the low profile type illustrated in FIG. 14 to 17 can be used. In this case, as illustrated in FIG. 5, the boot band 200 is caused to circle around the outer periphery of the large-diameter end 21 of the boot 20 in a state where the outer joint member 2 is supported by the support member 30 from below. Specifically, the band plate member 201 of the boot band 200 is rounded in a ring shape, and one end region 210 in the longitudinal direction of the band plate member 201 is overlapped on the outer diameter side of the other end region 220 in the longitudinal direction of the band plate member 201. At this time, the second tool claw 221 and the temporary fixing hook 222 provided in the end region 210 on the inner diameter side enter the engagement hole 212 provided in the end region 220 on the outer diameter side, and the engagement hole 212 and the temporary fixing hook 222 are engaged in the longitudinal direction. Further, the extending portion 225 provided in the end region 220 on the inner diameter side enters the recess 214 provided in the end region 210 on the outer diameter side, and these are engaged in the width direction (axial direction of the outer joint member 2).

In a state where the boot band 200 is temporarily fixed by engaging the engagement hole 212 with the temporary fixing hook 222 in this manner, the boot band 200 and the boot 20 are aligned in the circumferential direction so that the first tool claw 211 and the second tool claw 221 of the boot band 200 are arranged in the circumferential region R of the thin portion 21S of the boot 20. In the illustrated example, the circumferential position of the boot band 200 with respect to the boot 20 is adjusted so that the circumferential center line C of the thin portion 21S of the boot 20 is arranged between both tool claws 211 and 221 in the circumferential direction.

Figure 6:
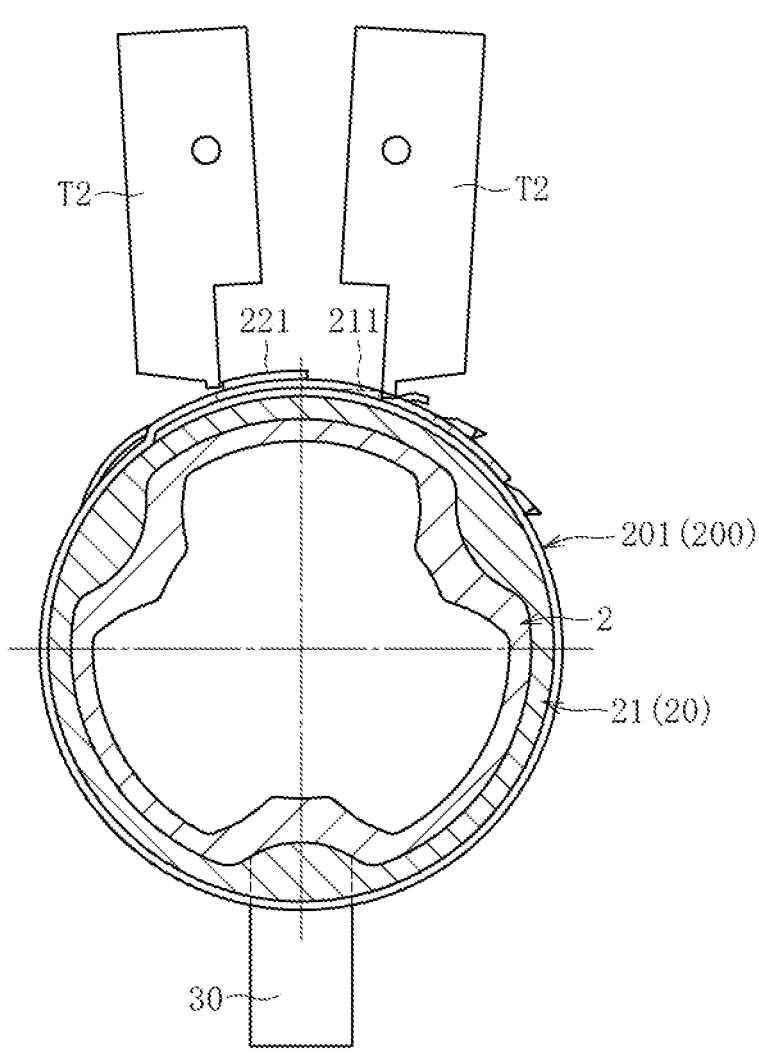
FIG. 6 is a cross-sectional view illustrating a state in middle of fastening the boot band of FIG. 5.
Figure 7:
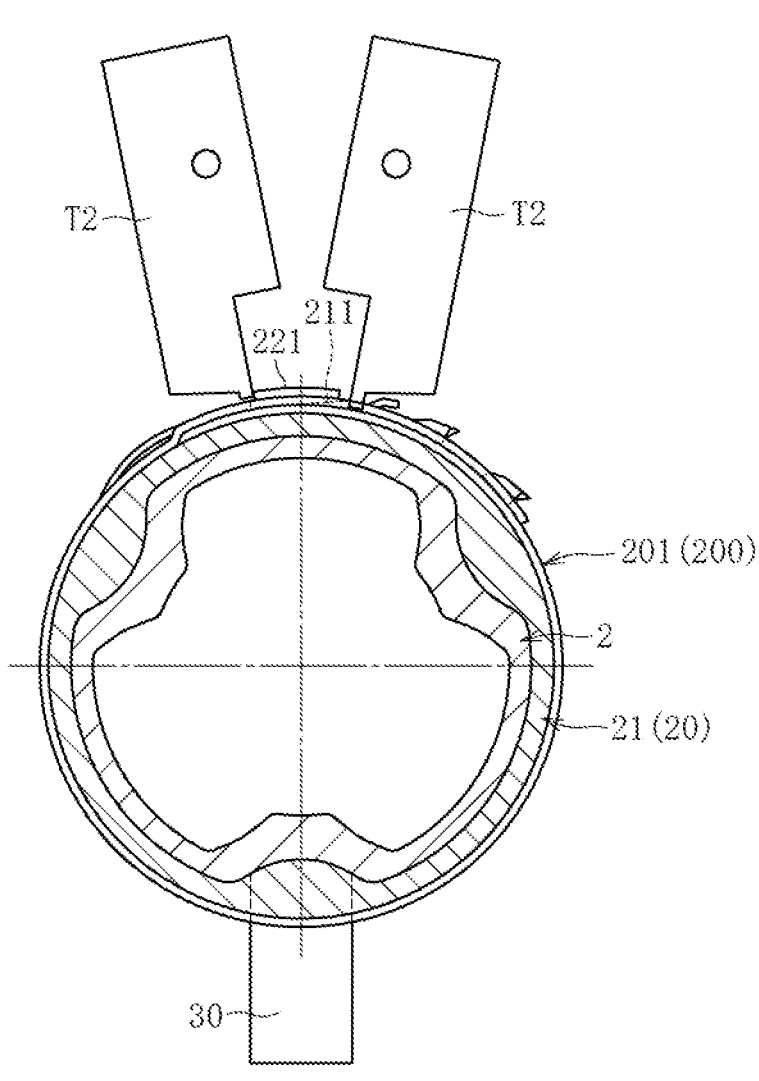
FIG. 7 is a cross-sectional view illustrating a state after the boot band of FIG. 5 is fastened.

In this state, the tool T2 is engaged with the first tool claw 211 and the second tool claw 221 from both sides in the circumferential direction, and both the tool claws 211 and 221 are brought close to each other, so that the diameter of the band plate member 201 of the boot band 200 rolled into a ring shape is reduced (see FIGS. 6 and 7). Thus, the large-diameter end 21 of the boot 20 is fastened from the outer diameter by the boot band 200, and the boot 20 is fixed to the outer joint member 2 by this fastening force.

In this way, when the tool claws 211 and 221 are brought close to each other by the tool T2, the pressing force in the inner diameter direction by the tool T2 is applied to the boot 20. At this time, since both the tool claws 211 and 221 are arranged in the circumferential region R of the thin portion 21S of the boot 20 as described above, the pressing force in the inner diameter direction by the tool T2 is applied to the thin portion 21S of the boot 20. Therefore, the deformation amount (compression amount) of the boot 20 can be suppressed as compared with the case where the thick portion 21L of the boot 20 is pressed in the inner diameter direction. Thus, it is possible to prevent deterioration in sealing performance between the boot 20 and the outer joint member 2 due to deformation of the boot 20.

Figure 8:
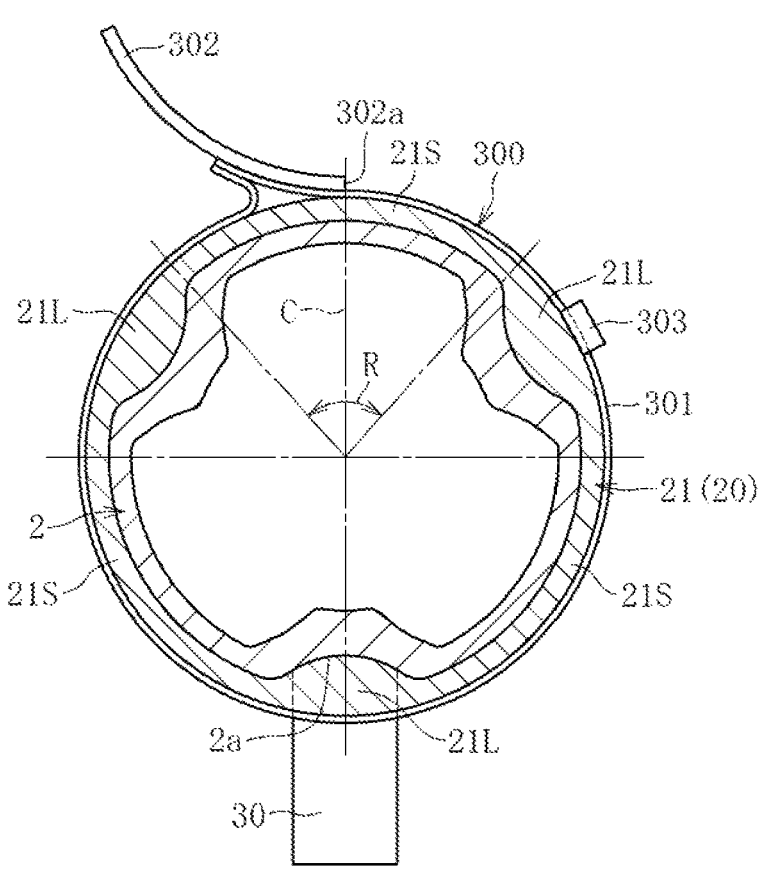
FIG. 8 is an axial orthogonal cross-sectional view of the tripod type constant velocity universal joint having a one-touch type boot band, illustrating a state before the boot band is fastened.
Figure 18:
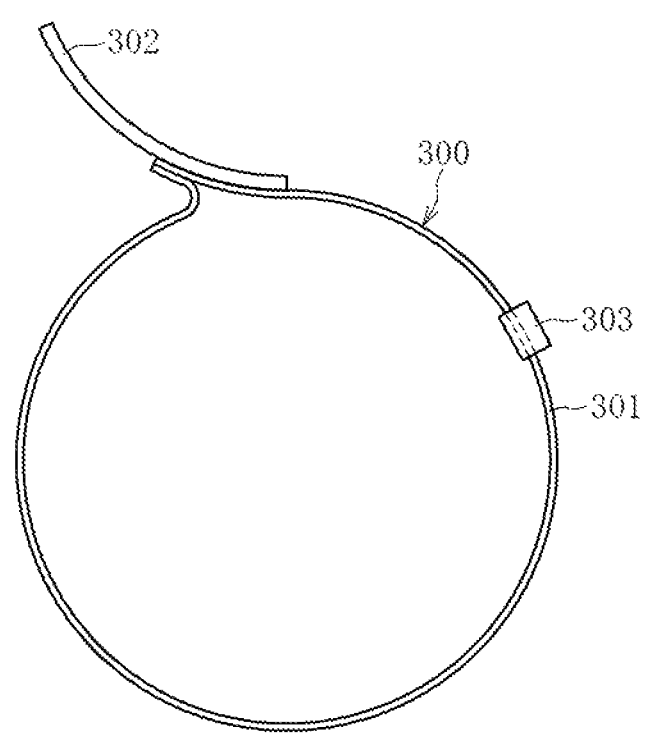
FIG. 18 is a side view of the one-touch type boot band, illustrating a state before fastening.
Figure 19:
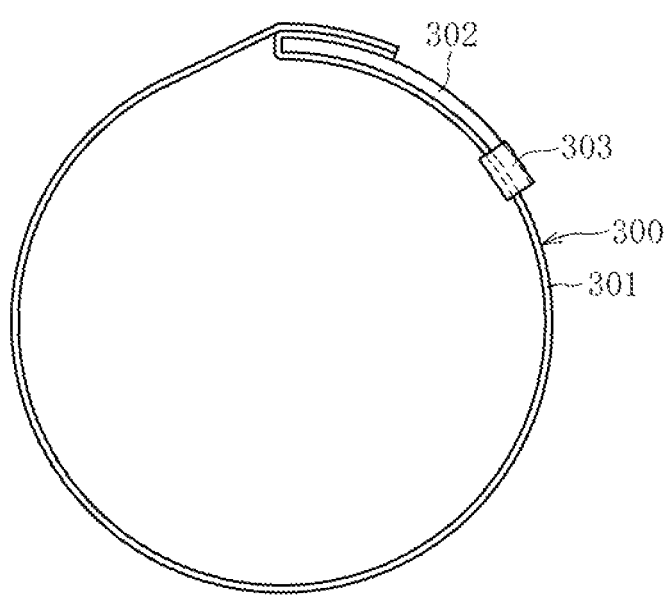
FIG. 19 is a side view illustrating a state after fastening the boot band in FIG. 18.
Figure 20:
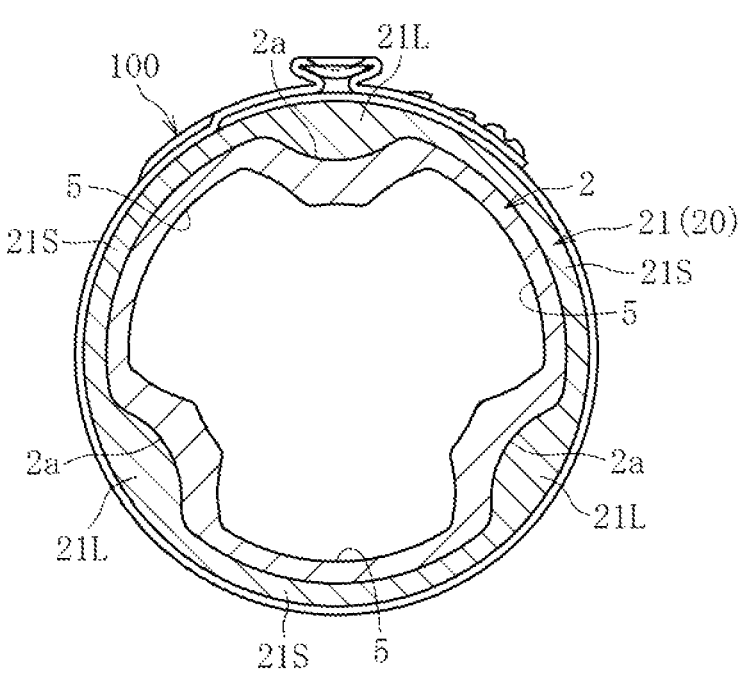
FIG. 20 is an axial orthogonal cross-sectional view illustrating a state where a boot and an outer joint member are fixed by the boot band of FIG. 10.

The boot band for fixing the boot 20 and the outer joint member 2 is not limited to the above, and for example, a one-touch type boot band 300 illustrated in FIGS. 18 and 19 can be used. In this case, as illustrated in FIG. 8, in a state where the outer joint member 2 is supported by the support member 30 from below, the large-diameter end 21 of the boot 20 is arranged on the inner periphery of the ring-shaped band main body 301 of the boot band 300, so that the band main body 301 of the boot band 300 is circulated around the outer periphery of the boot 20. At this time, the boot band 300 and the boot 20 are aligned in the circumferential direction so that one end 302a (an end serving as a fulcrum at the time of folding back) of the lever 302 of the boot band 300 is arranged in the circumferential region R of the thin portion 21S of the boot 20. In the illustrated example, the one end 302a of the lever 302 is arranged on the circumferential center line C of the thin portion 21S of the boot 20.

Figure 9:
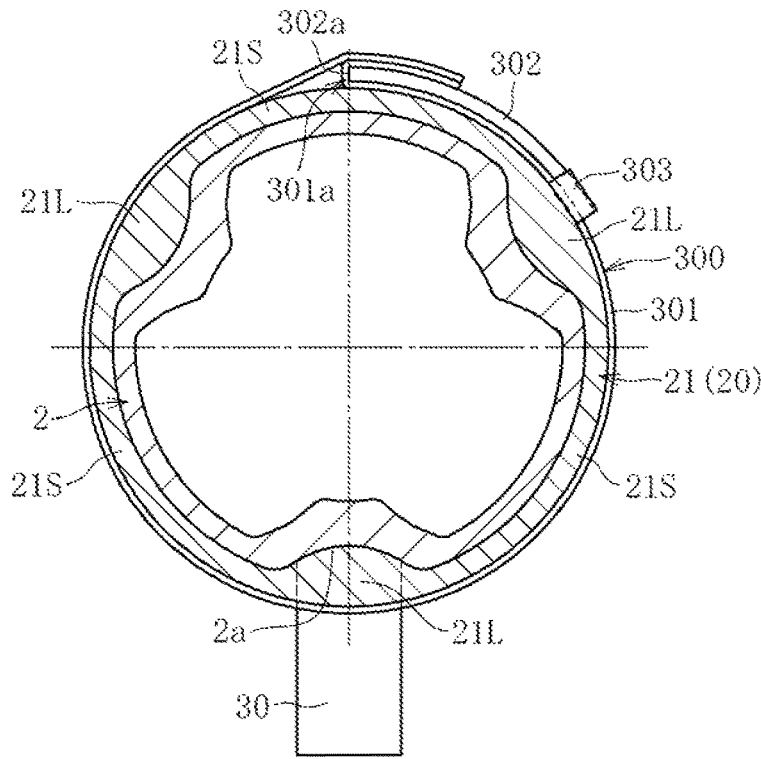
FIG. 9 is a cross-sectional view illustrating a state after the boot band of FIG. 8 is fastened.
Figure 10:
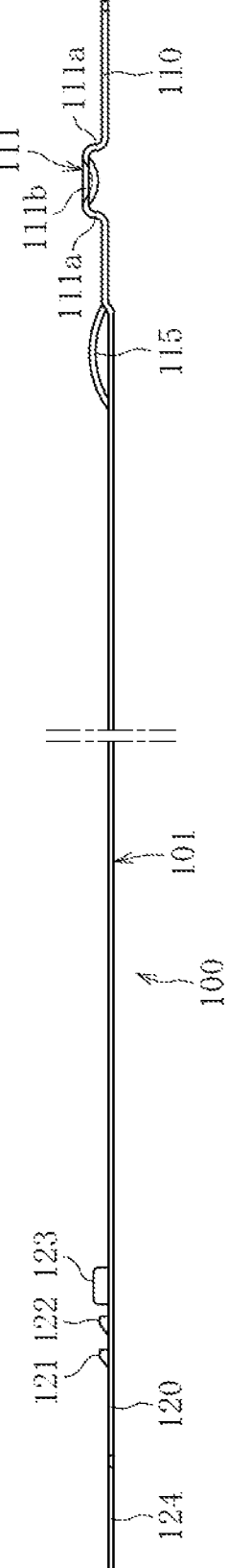
FIG. 10 is a side view of the omega type boot band.
Figure 11:
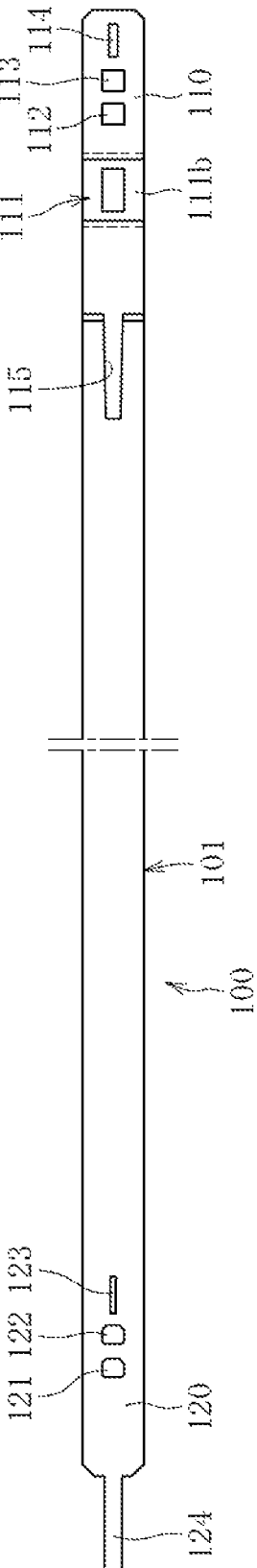
FIG. 11 is a plan view of the boot band of FIG. 10.
Figure 12:
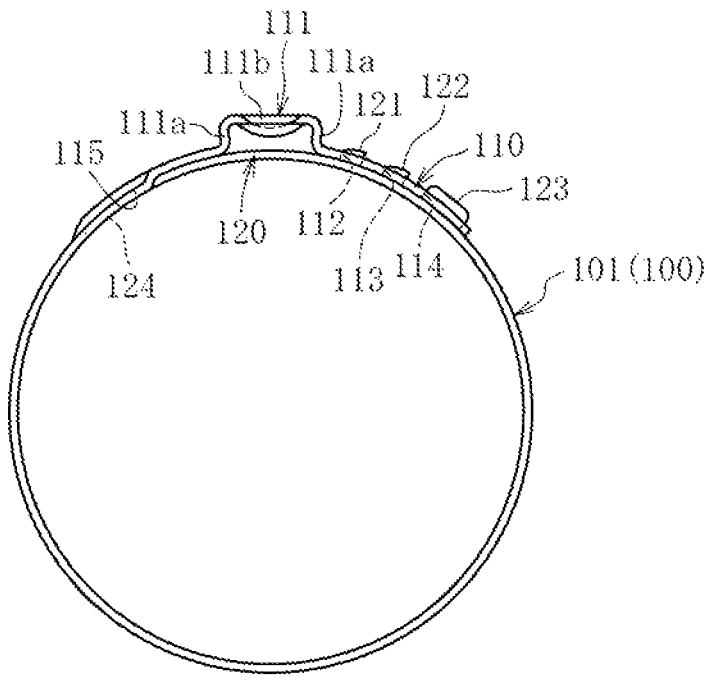
FIG. 12 is a side view of the boot band of FIG. 10 in a rounded state, illustrating a state before fastening.
Figure 13:
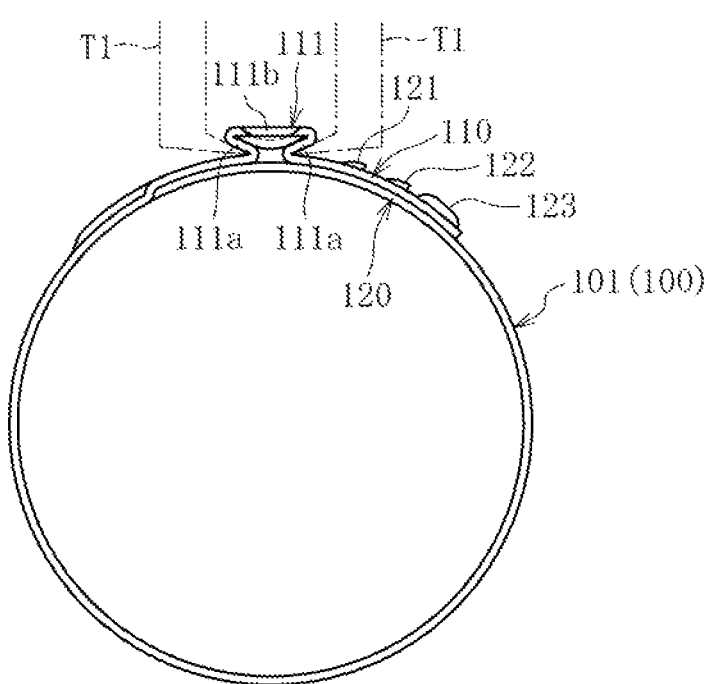
FIG. 13 is a side view illustrating a state after fastening the boot band in FIG. 12.
Figure 14:
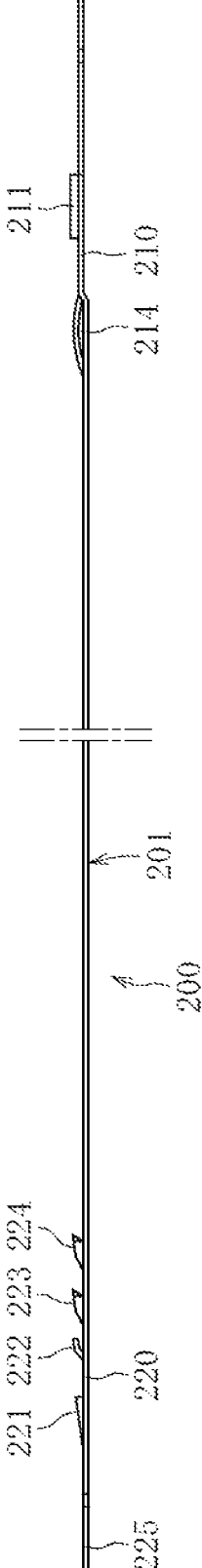
FIG. 14 is a side view of the low profile type boot band.
Figure 15:
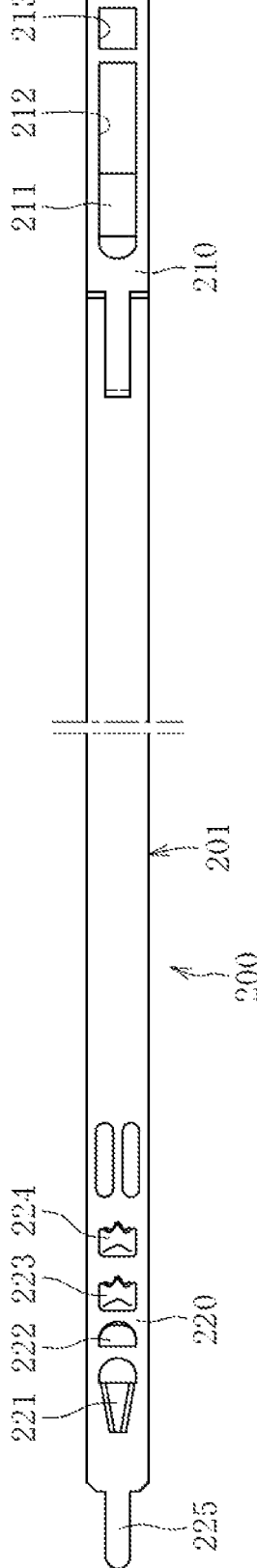
FIG. 15 is a plan view of the boot band of FIG. 14.
Figure 16:
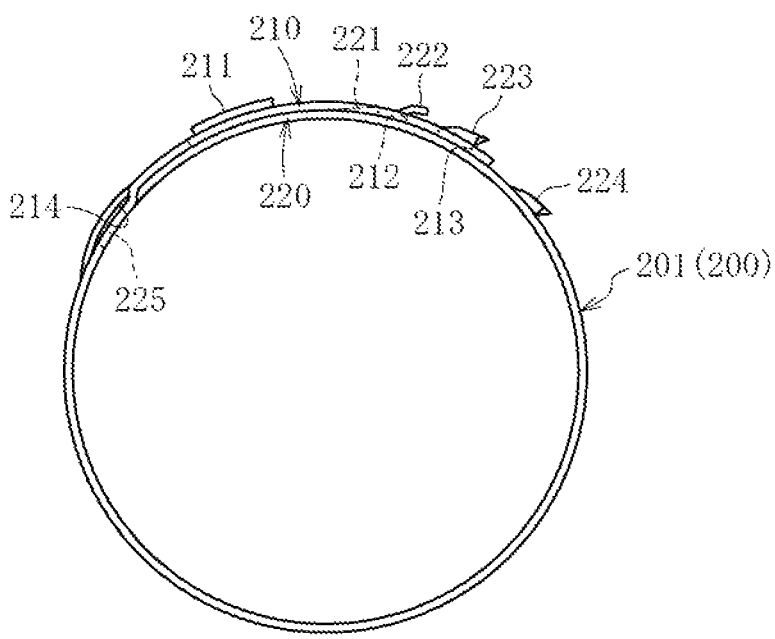
FIG. 16 is a side view of the boot band of FIG. 14 in a rounded state, illustrating a state before fastening.
Figure 17:
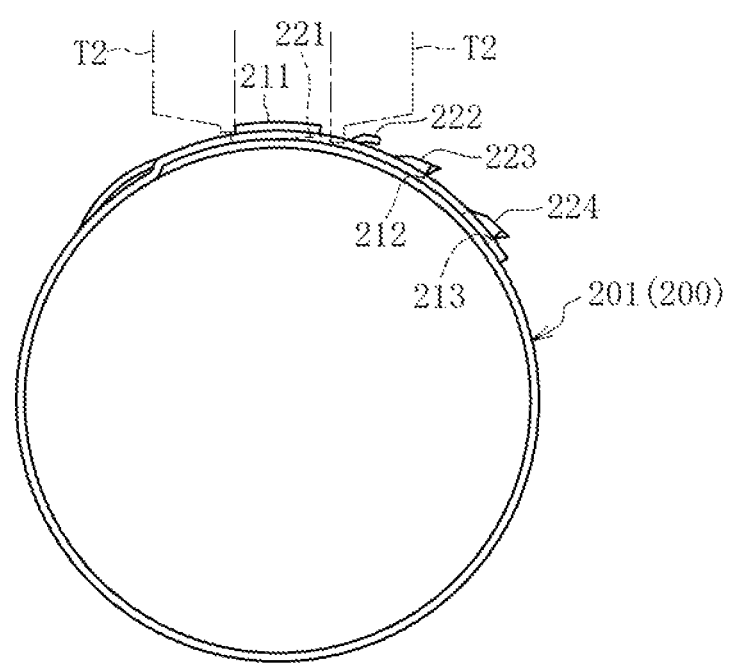
FIG. 17 is a side view illustrating a state after fastening the boot band in FIG. 16.

In this state, the diameter of the ring-shaped band main body 301 is reduced by folding back the lever 302 (see FIG. 9). Thus, the large-diameter end 21 of the boot 20 is fastened from the outer diameter by the boot band 300, and the boot 20 is fixed to the outer joint member 2 by this fastening force.

At this time, since the one end 302a of the lever 302 serving as a fulcrum at the time of folding presses a folded portion 301a of the band main body 301 in the inner diameter direction, a pressing force in the inner diameter direction is applied to the boot 20. At this time, since the one end 302a of the lever 302 is arranged in the circumferential region R of the thin portion 21S of the boot 20 as described above, the pressing force from the end 302a of the lever 302 is applied to the thin portion 21S of the boot 20. Therefore, the deformation amount (compression amount) of the boot 20 can be suppressed as compared with the case where the thick portion 21L of the boot 20 is pressed in the inner diameter direction. Thus, it is possible to prevent deterioration in sealing performance between the boot 20 and the outer joint member 2 due to deformation of the boot 20.

REFERENCE SIGNS LIST

1 Tripod type constant velocity universal joint
2 Outer joint member
3 Tripod member (inner joint member)
5 Track groove
10 Shaft
20 Boot
21 Large-diameter end
21L Thick portion
21S Thin portion
22 Small-diameter end 23 Bellows portion
100 Boot band (omega type)
111 Lug portion
200 Boot band (low profile type)
211, 221 Tool claw
300 Boot band (one-touch type)
301 Band main body
302 Lever
F Pressing force
T1, T2 Tool

The invention claimed is:

1. A constant velocity universal joint comprising:
an outer joint member;
an inner joint member provided in an inner periphery of the outer joint member;
a boot including a large-diameter end attached to an outer peripheral surface of the outer joint member; and
a boot band for fastening and fixing the large-diameter end of the boot to the outer peripheral surface of the outer joint member,
wherein the large-diameter end of the boot has a thin portion and a thick portion alternately in a circumferential direction, and
wherein a portion of the boot band to which a pressing force in an inner diameter direction is applied when fastening and fixing the boot to the outer joint member is arranged in a circumferential region of the thin portion of the large-diameter end of the boot.

2. The constant velocity universal joint according to claim 1,
wherein the boot band includes a lug portion of an Ω shape in a part of a longitudinal direction, and
wherein the lug portion is arranged in the circumferential region of the thin portion of the large-diameter end of the boot.

3. The constant velocity universal joint according to claim 1,
wherein the boot band includes a pair of tool claws spaced apart in a longitudinal direction, and
wherein the pair of tool claws is arranged in the circumferential region of the thin portion of the large-diameter end of the boot.

4. The constant velocity universal joint according to claim 1,
wherein the boot band includes a band main body having a ring shape and a lever having an arc-shape, one end of the lever being fixed to the band main body, and
wherein the one end of the lever is arranged in the circumferential region of the thin portion of the large-diameter end of the boot.

5. A method for fixing a boot of a constant velocity universal joint,
the boot comprising a large-diameter end having a thin portion and a thick portion alternately in a circumferential direction,
the method comprising:
fitting the large-diameter end of the boot to an outer periphery of an outer joint member;
causing a boot band to circle around an outer periphery of the large-diameter end of the boot; and
fastening the large-diameter end of the boot by reducing a diameter of the boot band,
wherein a portion of the boot band to which a pressing force in an inner diameter direction is applied when the boot band is reduced in diameter is arranged in a circumferential region of the thin portion of the large-diameter end of the boot.

6. The method for fixing the boot of the constant velocity universal joint according to claim 5, wherein the boot band includes a lug portion of an Q shape in a part of a longitudinal direction, and wherein the lug portion is crimped from both sides in a circumferential direction to reduce the diameter of the boot band in a state where the lug portion is arranged in the circumferential region of the thin portion of the large-diameter end of the boot.

7. The method for fixing the boot of the constant velocity universal joint according to claim 6, wherein the outer joint member is supported by a support member from below, and the large-diameter end of the boot is fastened with the boot band in a state where a protrusion surface provided at an upper end of the support member is fitted in a recess provided on an outer peripheral surface of the outer joint member.

8. The method for fixing the boot of the constant velocity universal joint according to claim 5, wherein the boot band includes a pair of tool claws spaced apart in a longitudinal direction, and wherein the pair of tool claws is brought close to each other to reduce the diameter of the boot band in a state where the pair of tool claws is arranged in the circumferential region of the thin portion of the large-diameter end of the boot.

9. The method for fixing the boot of the constant velocity universal joint according to claim 8, wherein the outer joint member is supported by a support member from below, and the large-diameter end of the boot is fastened with the boot band in a state where a protrusion surface provided at an upper end of the support member is fitted in a recess provided on an outer peripheral surface of the outer joint member.

10. The method for fixing the boot of the constant velocity universal joint according to claim 5, wherein the boot band includes a band main body having a ring shape and a lever having an arc-shape, one end of the lever being fixed to the band main body, and wherein the lever is folded back with the one end of the lever as a fulcrum to reduce the diameter of the band main body in a state where the one end of the lever is arranged in the circumferential region of the thin portion of the large-diameter end of the boot.

11. The method for fixing the boot of the constant velocity universal joint according to claim 10, wherein the outer joint member is supported by a support member from below, and the large-diameter end of the boot is fastened with the boot band in a state where a protrusion surface provided at an upper end of the support member is fitted in a recess provided on an outer peripheral surface of the outer joint member.

12. The method for fixing the boot of the constant velocity universal joint according to claim 5, wherein the outer joint member is supported by a support member from below, and the large-diameter end of the boot is fastened with the boot band in a state where a protrusion surface provided at an upper end of the support member is fitted in a recess provided on an outer peripheral surface of the outer joint member.

* * * * *